United States Patent
Liao

(10) Patent No.: US 8,421,924 B2
(45) Date of Patent: Apr. 16, 2013

(54) IMAGE PROCESSING CIRCUIT AND IMAGE PROCESSING METHOD

(75) Inventor: Ming-Hao Liao, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 592 days.

(21) Appl. No.: 12/685,384

(22) Filed: Jan. 11, 2010

(65) Prior Publication Data

US 2010/0182449 A1 Jul. 22, 2010

(30) Foreign Application Priority Data

Jan. 20, 2009 (TW) ................................ 98102071 A

(51) Int. Cl.
*H04N 5/00* (2011.01)
(52) U.S. Cl.
USPC ........ 348/624; 348/222.1; 348/630; 348/638; 348/649; 348/708; 386/300; 386/301; 386/302; 386/303; 386/304; 386/305; 725/1; 725/149
(58) Field of Classification Search .................. None
See application file for complete search history.

(56) References Cited

U.S. PATENT DOCUMENTS

| | | | | |
|---|---|---|---|---|
| 4,072,983 A | * | 2/1978 | Aschwanden | 348/504 |
| 4,574,301 A | * | 3/1986 | Sachs | 348/504 |
| 5,907,368 A | * | 5/1999 | Nakamura et al. | 348/520 |
| 6,377,313 B1 | * | 4/2002 | Yang et al. | 348/630 |
| 7,023,487 B1 | * | 4/2006 | Adams | 348/448 |
| 7,535,514 B2 | * | 5/2009 | Ahn et al. | 348/638 |
| 8,009,872 B2 | * | 8/2011 | Kurata | 382/107 |
| 2003/0210829 A1 | * | 11/2003 | Someya et al. | 382/263 |
| 2005/0134731 A1 | * | 6/2005 | Lee et al. | 348/458 |
| 2005/0174444 A1 | * | 8/2005 | Ueno | 348/231.6 |

* cited by examiner

*Primary Examiner* — Jun Fei Zhong
*Assistant Examiner* — Paul Graham
(74) *Attorney, Agent, or Firm* — Edell, Shapiro & Finnan, LLC

(57) ABSTRACT

An image processing method and its associated image processing circuit for processing an image based on a sequential couleur avec memoire (SECAM) system are provided. The image includes a first pixel, a second pixel and a third pixel, which are successively arranged in a same vertical line and are respectively corresponding to a first image signal and a second image signal and a third image signal. The image processing method includes steps of calculating a chroma signal via a vertical filtering process according to the first image signal, the second image signal and the third image signal; calculating a chroma angular frequency via a frequency modulation process according to the chroma signal; and generating a chromaticity according to the chroma angular frequency.

20 Claims, 8 Drawing Sheets

IMAGE PROCESSING CIRCUIT AND IMAGE PROCESSING METHOD

CROSS REFERENCE TO RELATED PATENT APPLICATION

This patent application is based on Taiwan, R.O.C. patent application No. 98102071 filed on Jan. 20, 2009.

FIELD OF THE INVENTION

The present invention relates to an image processing method and an image processing circuit, and more particularly, to an image processing method and an image processing circuit based on a sequential couleur avec memoire (SECAM) system.

BACKGROUND OF THE INVENTION

A composite video baseband signal (CVBS), a widely used analog video signal, is generated by mixing a luma signal and a chroma signal of an image. Three classifications of specifications associated with the CVBS are the National Television System Committee (NTSC) specification, the Phase Alternating Line (PAL) specification, and the SECAM specification.

FIG. 1 shows a waveform diagram of the CVBS. A synchronization prompt signal 10 is used for marking a start point of each of horizontal scan lines. A sinusoidal color burst signal 12 provides a reference signal associated with chromaticity. A staircase wave after the color bust signal 12 represents a luma signal of an image signal. For example, in FIG. 1, $V_{MAX}$ may correspond to a luminosity having a grayscale value 255, and $V_{MIN}$ may correspond to a luminosity having a grayscale value 0.

In the SECAM specification, a chroma signal is represented by a sinusoid added to a luma signal, such as the sinusoid signal added to the luma signal illustrated in FIG. 1. A chromaticity (color) is calculated by comparing angular frequencies of the chroma signal and a carrier burst signal.

FIG. 2 is an image processing circuit for decoding chroma components of a SECAM signal of the prior art. An image processing circuit 1 comprises a receiving unit 13, a filter unit 11, a frequency demodulation module 14 and a chroma converting unit 16. The filter unit 11 is coupled to the receiving unit 13, the frequency demodulation module 14 is coupled to the filter unit 11, and the chroma converting unit 16 is coupled to the frequency demodulation module 14.

The receiving unit 13 receives images encoded according to the SECAM specification. An images signal of one certain image among the received images is represented by S (S=Y+ Sin [$(\omega_c+\Delta\omega)*t+\phi_1$]), where Y is a luma signal, Sin [$(\omega_c+\Delta\omega)*t+\phi_1$] represents a chroma signal, $\omega_c$ is a carrier angular frequency of the SECAM system, $\Delta\omega$ is an angular frequency difference between an oscillator angular frequency and a carrier angular frequency of the image signal, and $\phi_1$ is a phase. Since the chroma signal based on the SECAM system is encoded via a frequency modulation approach, $\Delta\omega$ may correspond to a chromaticity.

The filter unit 11 mainly filters out luma components (the luma signal) from the image signal, and comprises a bandpass filter (not shown) and a cloche filter (not shown). Only chroma components (the chroma signal) remain in the image signal after the image signal is filtered, and the filtered chroma signal is then processed by the frequency demodulation module 14 to calculate $\Delta\omega$. After that, the chroma converting unit 16 generates a chromaticity (color) corresponding to $\Delta\omega$. The processes of the frequency demodulation module 14 and the chroma converting unit 16 are known to a person having ordinary skill in the art, and thus shall not be discussed for brevity.

In the SECAM system, a chroma signal of an image oscillates at a carrier angular frequency, which is 4.25 MHz or 4.41 MHz. When a luma signal illustrated in FIG. 3A oscillates at an angular frequency close to the carrier angular frequency, the luma signal cannot be filtered out via an image processing method of the prior art for the reason that high frequency components of the luma signal is taken into consideration in a frequency demodulation calculation of the chroma signal. Therefore, in the frequency demodulation calculation of the image processing method, regular oscillation of the luma signal corresponds to a chromaticity (color), thus resulting in abnormal color blocks in a grayscale multi-burst pattern. FIG. 3B is a schematic diagram of resulting abnormal color blocks in a multi-burst pattern, in which various black blocks are arranged at an interval and color blocks 20 are formed.

Therefore, a main object of an image processing method and an image processing circuit according to an embodiment of the present invention is to prevent formation of abnormal color blocks in a multi-burst pattern.

SUMMARY OF THE INVENTION

It is an objective of the invention to provide an image processing method for processing an image based on the SECAM system to address the problem of formation of abnormal color blocks in a multi-burst pattern.

According to an embodiment, the image comprises a plurality of pixels at least comprising a first pixel, a second pixel and a third pixel, which are successively arranged and respectively corresponding to a first image signal, a second image signal and a third image signal. The image processing method comprises steps below.

In Step (a), a first chroma signal is generated via a vertical filtering process according to the first image signal, the second image signal and the third image signal. In Step (b), a first chroma angular frequency is calculated via a frequency demodulation process according to the first chroma signal. In Step (c), a first chromaticity is calculated according to the first chroma angular frequency.

In addition, by implementing the image processing method of the present invention, an accurate color of a received image is calculated according to a color distribution.

In Step (d), a target image signal is selected from the first, second and third image signals, and a filtering process is performed on the target image signal to calculate a second chroma signal. In Step (e), a second chroma angular frequency is calculated via the frequency demodulation process according to the second chroma signal. In Step (f), a second chromaticity is obtained according to the second chroma angular frequency.

In Step (g), a representative chromaticity is calculated by adding two products of the first chromaticity from Step (c) multiplied by a first weight and the second chromaticity from Step (f) multiplied by a second weight. A proportion between the first and second weights is properly adjusted according to the color distribution of the received image. The present invention simultaneously applies the image processing method of the prior art and the foregoing image processing method, and thus the color distribution of an original image is more appropriately processed according to the image processing method of the present invention.

It is another objective of the invention to provide an image processing circuit for processing an image based on the SECAM system to address the problem of formation of abnormal color blocks in a multi-burst pattern.

According to an embodiment, an image processing circuit according to the present invention comprises a receiving unit, a vertical filter module, a frequency demodulation module and a chroma converting unit. The vertical filter module is coupled to the receiving unit, the frequency demodulation module is coupled to the vertical filter module, and the chroma converting unit is coupled to the frequency demodulation module.

The receiving unit is for receiving the image comprising a plurality of pixel at least comprising a first pixel, a second pixel and a third pixel, which are successively arranged in a same vertical line and are respectively corresponding to a first image signal, a second image signal and a third image signal.

The vertical filter module generates a first chroma signal according to the first image signal, the second image signal and the third image signal.

The frequency demodulation module calculates a first chroma angular frequency according to the first chroma signal. The chroma converting unit calculates a first chromaticity according to the first chroma angular frequency.

In conclusion, an image processing circuit and image processing method according to the present invention, via a vertical filtering process, are capable of effectively removing luma components oscillating at an angular frequency close to a carrier angular frequency such that the luma components are not brought into a subsequent frequency demodulation process. Therefore, the problem of formation of abnormal color blocks in a multi-burst pattern is effectively solved according to the present invention. In addition, the image processing method of the prior art and the image processing method according to the present invention are integrated via a chromaticity weight approach, in which a weight proportion is dynamically adjusted to even more appropriately process a color distribution of an image.

The advantages and spirit related to the present invention can be further understood via the following detailed description and drawings.

DETAILED DESCRIPTION OF THE PREFERRED EMBODIMENT

In order to gain a better understanding of embodiments of the present invention, five main parts are described below—a first part discusses a two-dimensional (2D) image processing method according to the present invention; a second part discusses the basis of how the 2D image processing method is capable of solving the problem of formation of abnormal color blocks in a multi-burst pattern; a third part discusses problems of the second 2D image processing method; a fourth part discusses how to define a weight of a chromaticity; and a fifth part discusses how to define a weight of a luminosity.

According to an image processing method of the prior art, a single pixel is processed to calculate a chromaticity. However, according to an image processing method of the present invention, at least three pixels successively arranged in a same vertical line are processed to calculate a chromaticity. Therefore, in the following description, the image processing method of the prior art is called a one-dimensional method, and the image processing method according to the present invention is called a 2D image processing method.

The first part of discussing the 2D image processing method according to the present invention shall be described below.

Figure 4:
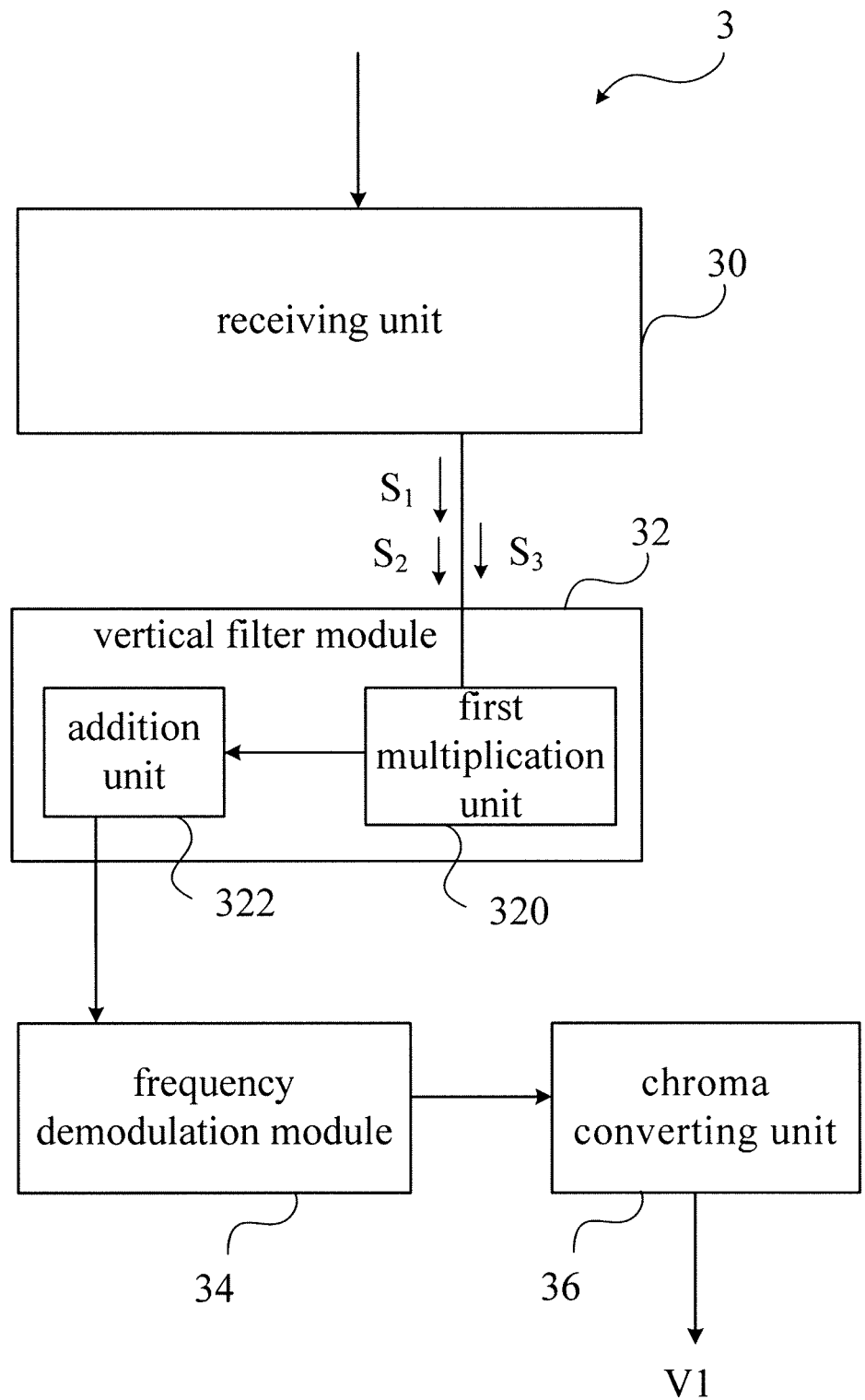
FIG. 4 is a block diagram of an image processing circuit in accordance with a first embodiment of the present invention.

FIG. 4 shows a block diagram of an image processing circuit 3 in accordance with a first embodiment of the present invention. The image processing circuit implementing the 2D image processing method according to the present invention comprises a receiving unit 30, a vertical filter module 32, a frequency demodulation module 34 and a chroma converting unit 36. The vertical filter module 32 coupled to the receiving unit 30 filters out luma components of an image signal to retain a chroma signal. The frequency demodulation module 34 coupled to the vertical filter module 32 demodulates a chroma angular frequency of the chroma signal. The chroma converting unit 36 coupled to the frequency demodulation module 34 converts the chroma angular frequency to a chromaticity.

The receiving unit 30 receives an image encoded according to the SECAM specification. The image at least comprises three pixels, which are successively arranged in a same vertical line and respectively corresponding to a first image signal $S_1$, a second image signal $S_2$ and a third image signal $S_3$. The vertical filter module 32 calculates a chroma signal according to the first image signal $S_1$, the second image signal $S_2$ and the third image signal $S_3$. The frequency demodulation module 34 calculates a chroma angular frequency according to the chroma signal, and the chroma converting unit 36 finds a first chromaticity V1 corresponding to the chroma angular frequency.

The vertical filter module 32 comprises a first multiplication unit 320 and an addition unit 322. The first multiplication unit 320 respectively multiplies the first image signal $S_1$, the second image signal $S_2$ and the third image signal $S_3$ by a first multiple, a second multiple and a third multiple. A sum of the first multiple, the second multiple and the third multiple is zero.

The addition unit 322 coupled to the first multiplication unit 320 adds up the multiplied first image signal, the multiplied second image signal and the multiplied third image signal. Since the sum of the first multiple, the second multiple and the third multiple is zero, a sum of the luma components is zero, thus filtering a chroma signal of the image signal.

A signal based on the SECAM system has characteristics below. The signal comprises three successively, vertically arranged pixels, which respectively correspond to three image signals. Among the three image signals, a difference π is present between a phase of one pixel and those of the other two pixels (supposing that the three pixels have the same luminosity and chromaticity). In order to better understand the foregoing description, a process flow of the vertical filter module 32 shall be discussed for example. The first image signal $S_1$, the second image signal $S_2$ and the third image signal $S_3$, corresponding to the three pixels successively arranged in the vertical line, are represented by:

$$S_1 = Y + \text{Sin}\,[(\omega_c + \Delta\omega)*t + \phi_1],$$

$$S_2 = Y + \text{Sin}\,[(\omega_c + \Delta\omega)*t + \phi_1],$$

$$S_3 = Y + \text{Sin}\,[(\omega_c + \Delta\omega)*t + \phi_1 + \pi].$$

The first multiplication unit 320 respectively multiplies $S_1$, $S_2$ and $S_3$ by the first multiple $N_1$, the second multiple $N_2$ and the third multiple $N_3$ to obtain three products to be added up by the addition unit 322, where a sum of $N_1$, $N_2$ and $N_3$ is zero. The sum added up by the addition unit 322 is represented by:

$$N_1 * S_1 + N_2 * S_2 + N_3 * S_3 = Y*(N_1+N_2+N_3) + N_1*\text{Sin}\,[(\omega_c+\Delta\omega)*t+\phi_1] + N_2 \text{Sin}\,[(\omega_c+\Delta\omega)*t+\phi_1] + N_3 \text{Sin}\,[(\omega_c+\Delta\omega)t+\phi_1+\pi] = Y(N_1+N_2+N_3) + (N_1+N_2-N_3)\,\text{Sin}\,[(\omega_c+\Delta\omega)*t+\phi_1],$$

where the first item $Y*(N_1+N_2+N_3)$ is equal to zero, meaning that the luma components are filtered out, whereas the other item $(N_1+N_2-N_3)\text{Sin}\,[(\omega_c+\Delta\omega)*t+\phi_1]$ is not equal to zero, meaning that the chroma signal is retained. Therefore, the vertical filter module 32 filters to effectively retain the chroma signal in the image signal, and the chroma signal is called a first chroma signal in the following description.

The first chroma signal filtered from the vertical filter module 32 is transmitted to the frequency demodulation module 34 for demodulating a first chroma angular frequency ($\Delta\omega$) of the first chroma signal. Operation principle of the frequency demodulation module 34 is identical to that of the frequency demodulation module 14 and shall not be further disclosed for brevity.

It is to be noted that, on the basis of continuous variation in a phase angle, an absolute value of $\Delta\omega$ is no more than $\pi$ (180 degrees), such that a difference between two phrases corresponding to two pixels lies between $\pi$ to $-\pi$. In other words, $2\pi$ is to be subtracted from the difference greater than $\pi$, and $2\pi$ is to be added to the difference smaller than $-\pi$.

The foregoing description discloses the image processing circuit and the image processing method applied by the image processing circuit according to the present invention. Next, the reason why abnormal color blocks in a multi-bursting pattern are resulted from using the one-dimensional image processing method but not from the 2D image processing method according to the present invention shall be described below.

The second part discusses how the problem of formation of abnormal color blocks in a multi-burst pattern by using the 2D image processing method is solved.

For example, in a black and white multi-burst pattern, a target image signal S' is:

$$S' = Y + \text{Sin}\,[(\omega_c)*t],$$

For that the black and white multi-burst patter does not contain other colors, the chroma angular frequency $\Delta\omega$ representing chroma is zero and Y representing luma components varies at a predetermined frequency in the multi-burst pattern. In this embodiment, the luma components oscillate at an angular frequency $\omega_c+\omega$ close to the carrier angular frequency $\omega_c$, where $\delta\omega$ represents a small angular frequency difference.

Figure 1:
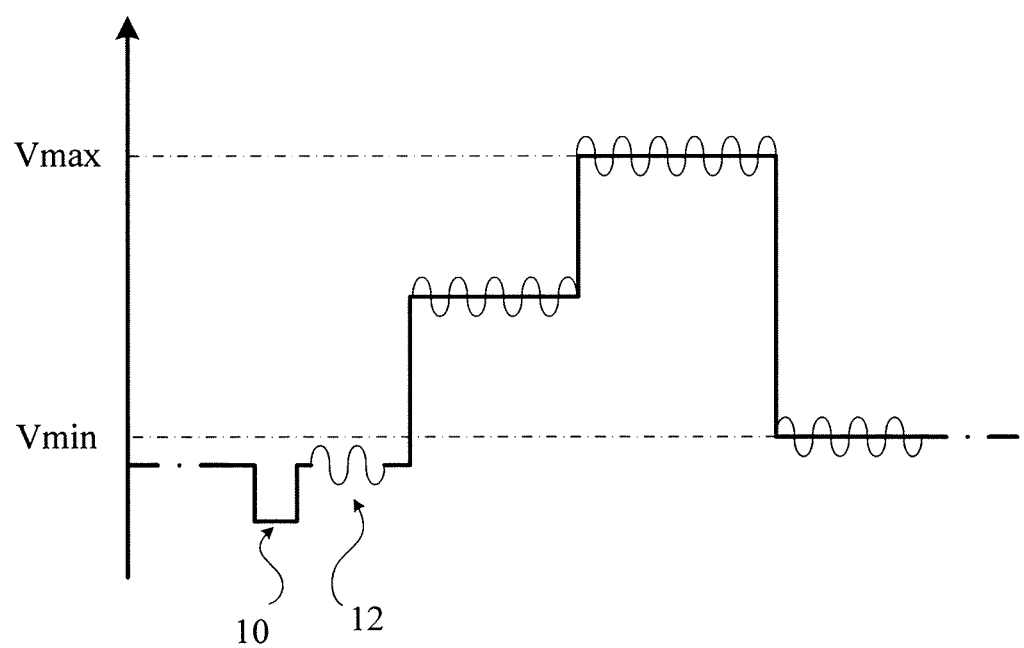
FIG. 1 is a waveform diagram of a common CVBS.
Figure 2:
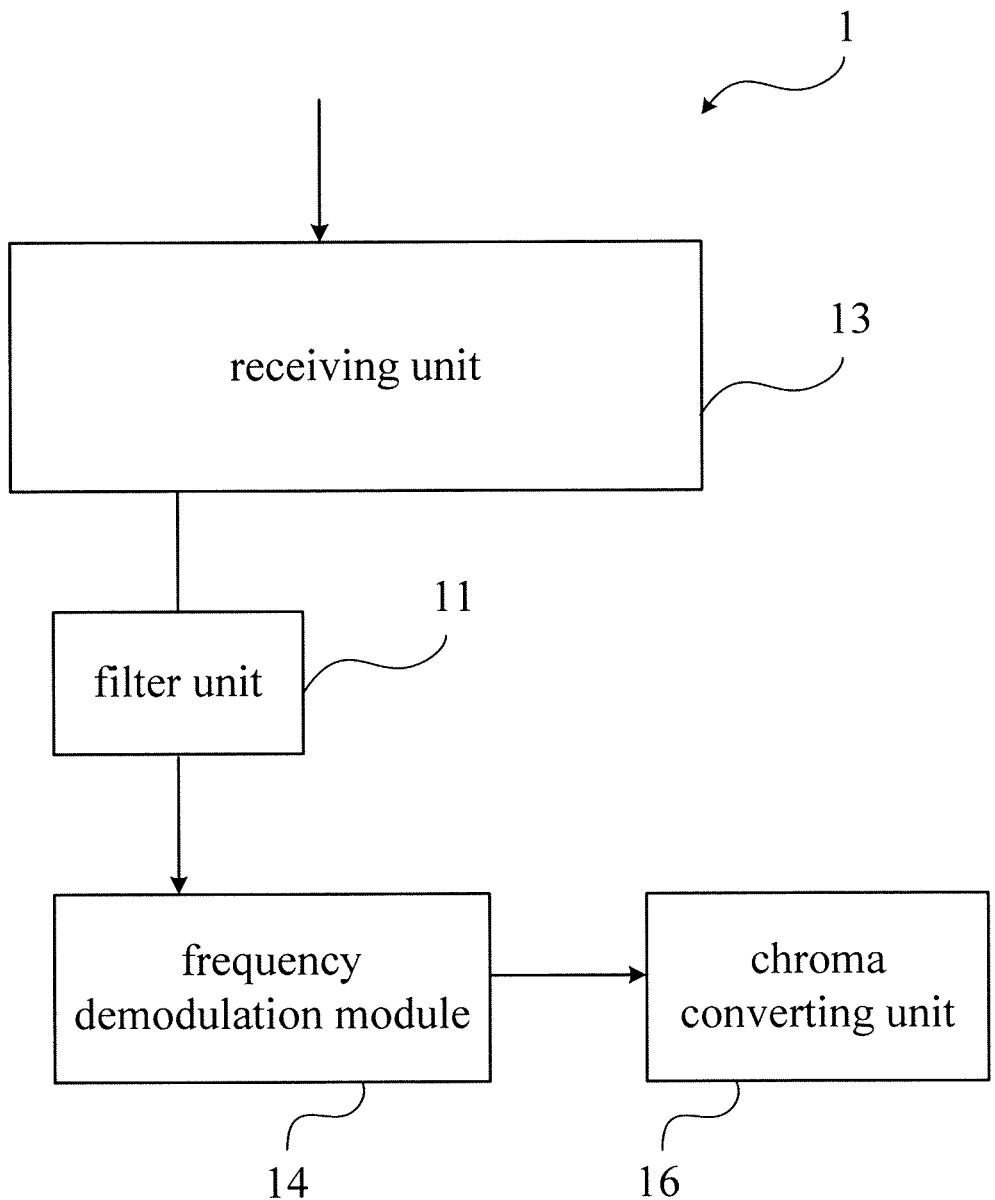
FIG. 2 is a block diagram of an image processing circuit of the prior art.

Generally, the luma components being low-frequency have frequencies much lower than the carrier angular frequency $\omega_c$, in a way that a conventional filter unit 11 illustrated in FIG. 2 is capable of filtering out the luma components by filtering in conjunction with a predetermined frequency range. However, when the oscillating angular frequencies of the luma components get too close to the carrier angular frequency $\omega_c$, the conventional filter unit 11 illustrated in FIG. 2 becomes unable to effectively filter out the luma components. That is, the luma components oscillating at the predetermined oscillating angular frequency are mistaken for chroma components, which shall create abnormal color blocks in the black and white multi-burst pattern as illustrated in FIG. 3B.

With respect to the multi-burst pattern, the vertical filter module 32 of the image processing circuit 3 applies characteristics of the SECAM system to filter luma components rather than applying the frequency filter approach. Therefore, the image processing circuit according to the present invention is capable of effectively processing oscillating luma components so that abnormal color blocks in a black and white multi-burst pattern are not formed after decoding.

The third part discusses problems of the 2D image processing method. The image processing image method may generate undesirable results when implementing the image processing circuit 3 illustrated in FIG. 4 in two situations: (a) cross-chroma areas and (b) a non-uniform color distribution, both of which shall be described below.

Figure 5:
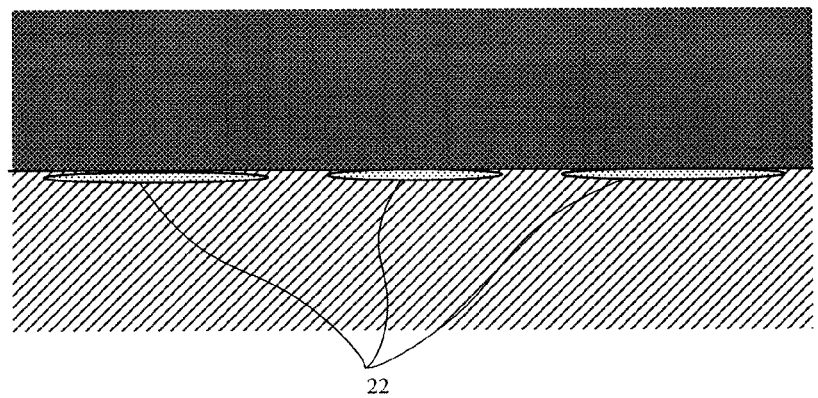
FIG. 5 is a schematic diagram of a color distribution in accordance with an embodiment of the present invention.

The situation (a) is to be discussed with reference to FIG. 5. In the foregoing 2D image processing method, it is a prerequisite that three pixels successively arranged in a vertical line oscillate at a same frequency. However, in the situation (a) of cross-chroma areas, an edge of the area intercepts the three successive pixels, and thus one of the pixels has an angular oscillating frequency different from those of the other two pixels.

For example, the second pixel and the third pixel, from the three successively arranged pixels, are located in different chroma areas. Accordingly, image signals $S_1'$, $S_2'$ and $S_3'$ of the first, second and third pixels are respectively represented by:

$$S_1' = Y + \text{Sin}\,[(\omega_c+\Delta\omega_1)*t+\phi_1],$$

$$S_2' = Y + \text{Sin}\,[(\omega_c+\Delta\omega_1)*t+\phi_1],$$

$$S_3' = Y + \text{Sin}\,[(\omega_c+\Delta\omega_2)*t+\phi_1+\pi],$$

where $\Delta\omega_2$ is not equal to $\Delta\omega_1$.

The vertical filter module 32 calculates and generates an item $\text{Sin}\,[(\omega_c+\Delta\omega_1)*t]+\text{Sin}\,[(\omega_c+\Delta\omega_2)*t]$, which is equal to signals having oscillating frequencies $\omega_c+\Delta\omega_1$ and $\omega_c+\Delta\omega_2$. Moreover, the chromaticity calculated by the frequency demodulation module 34 and the chroma converting unit 36 illustrated in FIG. 4 is a result of mixing colors corresponding to $\Delta\omega_1$ and $\Delta\omega_2$ but not colors corresponding to $\Delta\omega_1$ or $\Delta\omega_2$. That is, in the situation (a) of cross-chroma areas, a color different from two adjacent chroma areas is decoded and a color block is formed at the edge of chroma areas as illustrated in FIG. 5. FIG. 5 shows an abnormal color block 22 being formed at the edge between two adjacent chroma areas having different chromaticities.

Figure 6:
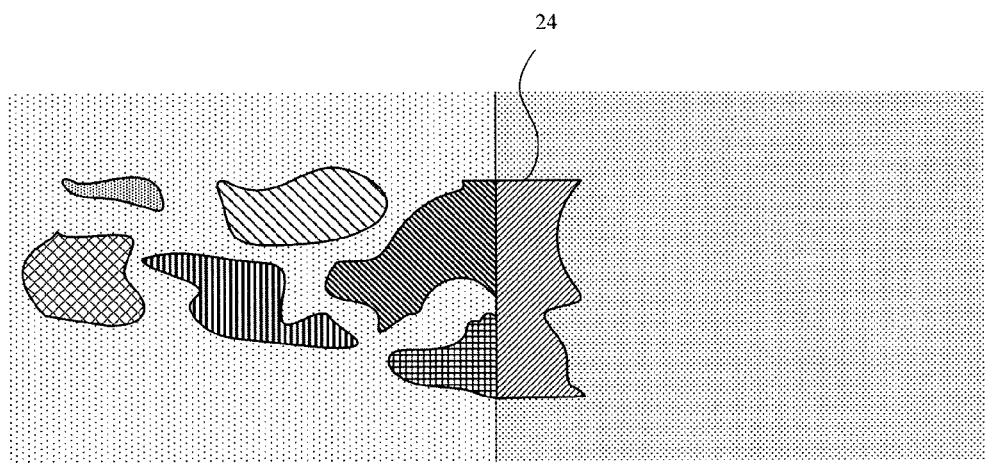
FIG. 6 a schematic diagram of a color distribution in accordance with another embodiment of the present invention.

Referring to FIG. 6, the situation (b) of a non-uniform color distribution is to be discussed. According to the foregoing 2D image processing method, it is a prerequisite that, among three image signals corresponding to three successively arranged pixels, a difference $\pi$ is present between a phase of one pixel and those of the other two pixels, which is a characteristic of the SECAM system. However, when a front-end of a horizontal scan line has a non-uniform color distribution such as a color distribution at the left part shown in FIG. 6, an additional phase difference is created. For example, images signals $S_1''$, $S_2''$ and $S_3''$ respectively corresponding to first, second and third horizontal scan line are represented by:

$$S_1''=Y+\text{Sin}\,[(\omega_c+\Delta\omega)*t+\phi_1],$$

$$S_2''=Y+\text{Sin}\,[(\omega_c+\Delta\omega)*t+\phi_2],$$

$$S_3''=Y+\text{Sin}\,[(\omega_c+\Delta\omega)*t+\phi_3+\pi],$$

where $+\pi$ is a phase difference defined in the SECAM specification, and $\phi_1$, $\phi_2$ and $\phi_3$ are phase differences resulting from the non-uniform color distribution at the front-end.

Therefore, the phase differences of the image signals corresponding to the successively arranged pixels are not simply equal to the difference $\pi$. Suppose that a phase difference between $\phi_1$, $\phi_2$ and $\phi_3+\pi$ is zero. The phase difference is transmitted to the vertical filter module 32 illustrated in FIG. 4 to output a result of zero regarded as a signal represented by $\text{Sin}\,[(\omega_c+(-\omega_c))*t]$. That is, an absolute value of the chroma angular frequency is equal to the carrier angular frequency; however, the chroma frequency is in fact not equal to the carrier frequency. According to a SECAM check table of chroma frequencies and chromaticities (colors), $\Delta\omega=-\omega_c$ corresponds to crimson. In conclusion, referring to FIG. 6, unexpected colors may be calculated and rendered according to the 2D image processing method. FIG. 6 shows horizontally adjacent chroma areas with different chromaticities, and colors of the left side are non-uniformly distributed, such that abnormal blocks 24 result at the adjoining edge of the horizontally adjacent chroma areas.

The fourth part discusses defining a weight of a chromaticity. In order to solve image processing problems encountered in the situation (a) and the situation (b), an approach of involving weights is defined. More particularly, referring to FIG. 7A, a same image is processed via a 2D image processing method (i.e., using a vertical filter module 52, a frequency demodulation module 54 and a chroma converting unit 58) to obtain a first chromaticity, and via a one-dimensional image processing method (i.e., using a band-pass filter unit 51, a frequency demodulation module 54 and a chroma converting unit 58) to obtain a second chromaticity. After that, the first chromaticity and the second chromaticity are respectively multiplied by a first weight and a second weight to calculate a representative chromaticity. By adjusting the first weight and the second weight, importance of the first chromaticity and the second chromaticity is defined. Accordingly, the image processing method according to an embodiment of the present invention may be applied to different color display situations, thereby rendering better application flexibility to the image processing method according to the invention.

Figure 7A:
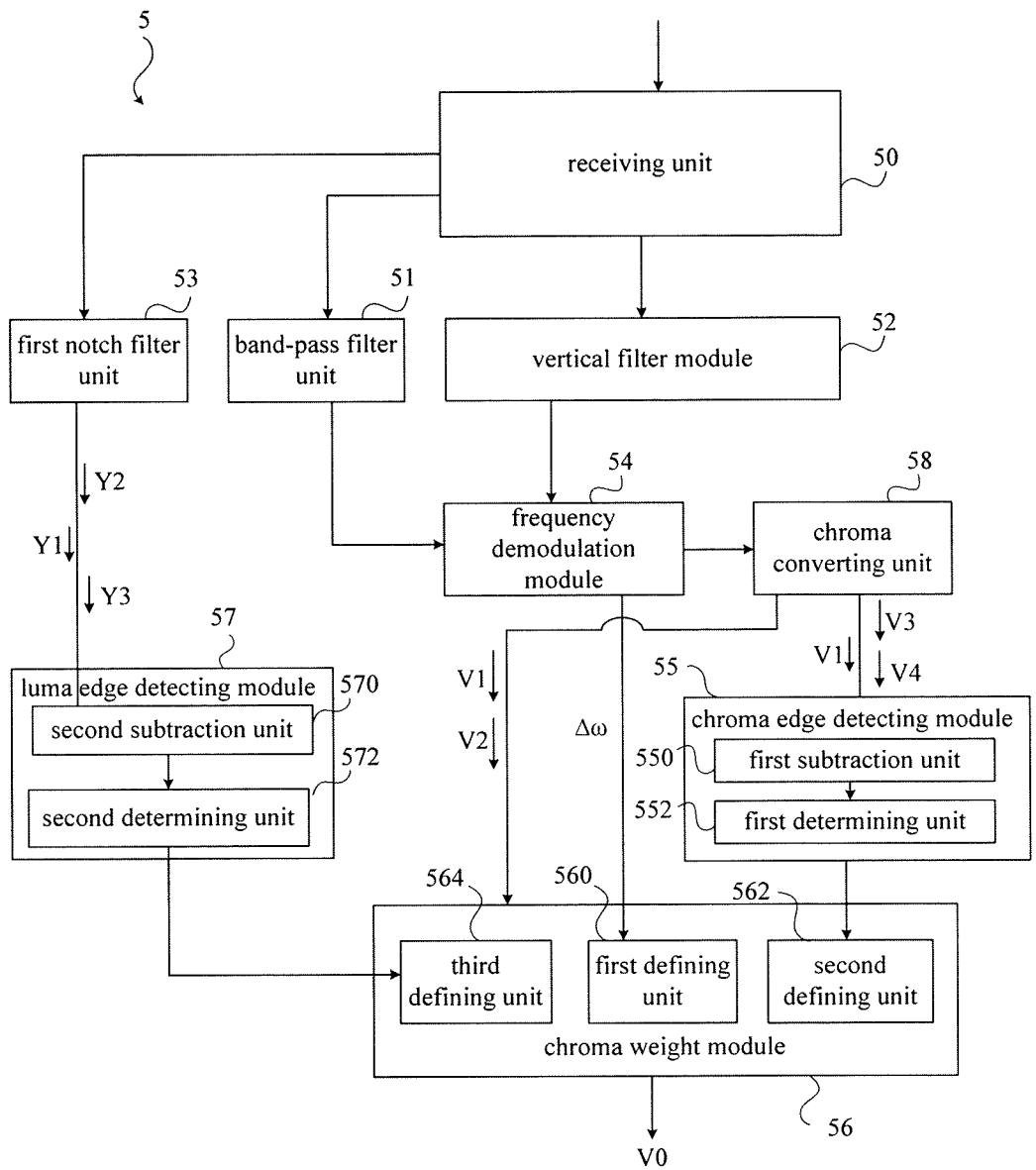
FIG. 7A is a block diagram of an image processing circuit in accordance with a second embodiment of the present invention.

Referring to FIG. 7A, an image processing circuit 5 comprises a chroma weight module 56 coupled to the chroma converting unit 58. The chroma weight module 56 respectively multiplies a first chromaticity V1 and a second chromaticity V2 by the first weight and the second weight to calculate a representative chromaticity V0.

The chroma weight module 56 comprises a first defining unit 560, a second defining unit 562 and a third defining unit 564. A chromaticity is weighted with respect to different situations, and a detailed flow thereof shall be described below.

According to the description of a non-uniform color distribution in the abovementioned third part, an angular frequency difference between a first chroma angular frequency calculated in the 2D image processing method and a carrier angular frequency based on the SECAM system may be rather large, and thus the first defining unit 560 properly reduces the first weight and increases the second weight for such situation.

That is, when the angular frequency difference between the first chroma angular frequency and the carrier angular frequency based on the SECAM system is rather large, an undesirable effect may be resulted according to the 2D image processing method. Therefore, the 2D image processing method according to an embodiment of the present invention is incorporated with the one-dimensional image processing method to gain a better effect.

According to the foregoing description, the first defining unit 560 determines whether the first chroma angular frequency is greater than a predetermined threshold. When the answer is yes, the first weight is defined as being smaller than the second weight; otherwise, the first weight is defined as being greater than the second weight.

An image received by a receiving unit 50 further comprises a fourth pixel and a fifth pixel. Further, in a vertical direction, the fourth pixel, the first pixel, the second pixel, the third pixel, and the fifth pixel, successively arranged downwards, respectively corresponds to a fourth image signal, the first image signal, the second image signal, the third image signal and a fifth image signal. The vertical filter module 52, the frequency demodulation module 54 and the chroma converting unit 58 calculates a third chromaticity V3 according to the fourth, the first and the second image signals, and calculates a fourth chromaticity V4 according to the second, the third and the fifth image signals.

The image processing circuit 5 further comprises a chroma edge detecting module 55 coupled to the chroma converting unit 58. The chroma edge detecting module 55 calculates a chroma edge intensity (i.e., chromaticity difference) according to the third chromaticity V3, the first chromaticity V1 and the fourth chromaticity V4, which are outputted by the chroma converting unit 58.

The second defining unit 562 of the chroma weight module 56 coupled to the chroma edge detecting module 55 defines the first and second weights for calculating the representative chromaticity V0 according to the chroma edge intensity outputted by the chroma edge detecting module 55.

Logically, when a chroma edge is present between the first pixel, the second pixel and the third pixel, it means a significant difference exists between two chromaticities among the first chromaticity V1, the third chromaticity V3 and the fourth chromaticity V4. Therefore, according to the present invention, the chroma edge intensity (chromaticity difference) is used for determining whether an edge of a chroma area is present. The calculation of the chroma edge intensity is described below.

The chroma edge detecting module 55 comprises a first subtraction unit 550, and a first determining unit 552 coupled to the first subtraction unit 550. The first subtraction unit 550 subtracts the first chromaticity V1 from the third chromaticity V3 to calculate a first chromaticity difference, and subtracts the first chromaticity V1 from the fourth chromaticity V4 to calculate a second chromaticity difference. The first determining unit 552 determines whether an absolute value of the first chromaticity difference is greater than that of the second chromaticity difference. When the answer is yes, the first determining unit 552 defines the chroma edge intensity as the absolute value of the first chromaticity difference. When the answer is no, the first determining unit 552 defines the chroma edge intensity as the absolute value of the second chromaticity difference.

When two vertically arranged pixels arranged belong to different chroma areas, a difference may exist between chromaticities corresponding to the pixels. Therefore, the second defining unit 562 identifies whether the pixels are located at a cross-chroma area according to the chroma edge intensity.

Accordingly, the second defining unit 562 defines the first weight and the second weight according to the chroma edge intensity (chromaticity difference). For example, when the chroma edge intensity is the absolute value of the first chromaticity difference and is greater than a predetermined threshold, it is rather possible that a chroma area edge exists between the first pixel and the third pixel. Therefore, the first chromaticity V1 calculated according to the 2D image processing method is given a lower weight.

In addition to identifying the chroma edge, a luma edge is also taken into consideration according to the present invention.

Figure 7B:
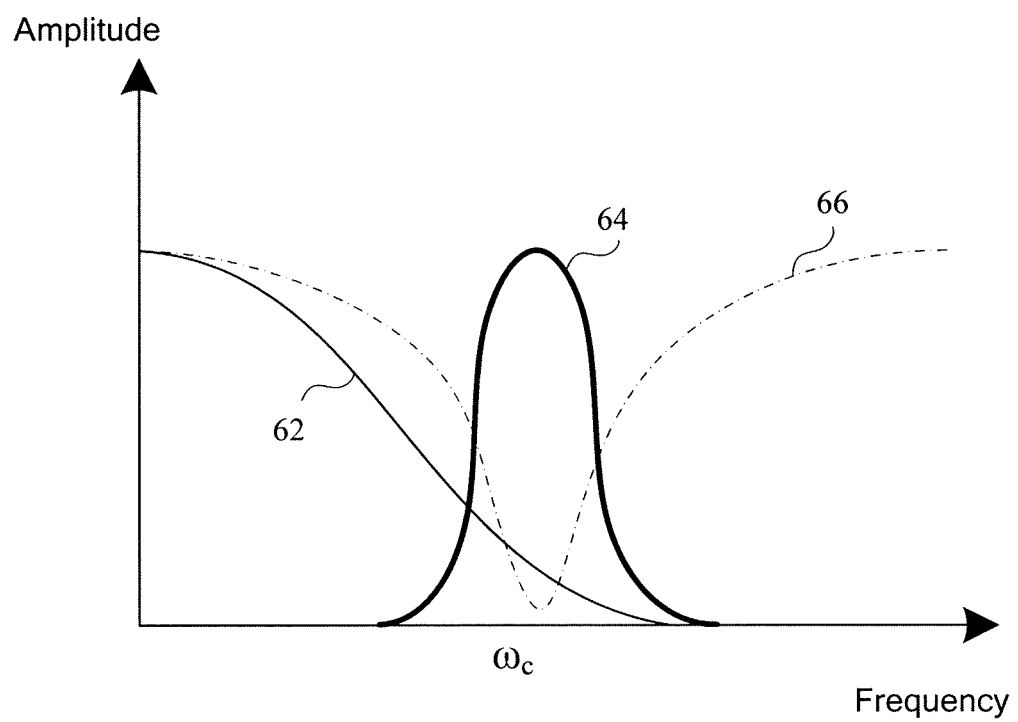
FIG. 7B is a spectrum of an image signal in accordance with another embodiment of the present invention.

Referring to FIG. 7A, the image processing circuit 5 further comprises a first notch filter unit 53 coupled to the receiving unit 50, and a luma edge detecting module 57 coupled to the first notch filter unit 53. The first notch filter unit 53 processes the first image signal, the second image signal and the third image signal to calculate a first luminosity Y1 corresponding to the first pixel, a second luminosity Y2 corresponding to the second pixel, and a third luminosity Y3 corresponding to the third pixel. Referring to FIG. 7B, a curve 62 and a curve 64 respectively represent luma components and chroma components of image signals, a dashed line 66 indicates that the first notch filter unit 53 retains most of low frequency signals (i.e., the luma components) and filters outs signals within a frequency range whose center is a carrier angular frequency $\omega_c$ (i.e., the chroma components).

The luma edge detecting module 57 calculates a luma edge intensity according to the first luminosity Y1, the second luminosity Y2 and the third luminosity Y3, which are outputted by the first notch filter unit 53.

The chroma weight module 56 comprising the third defining unit 564 is coupled to the luma edge detecting module 57. The third defining unit 564 defines the first and second weights for calculating the representative chromaticity V0.

The luma edge detecting module 57 calculates the luma edge intensity via a second subtraction unit 570 and a second determining unit 572 coupled to the second subtraction unit 570. The second subtraction unit 570 subtracts the second luminosity Y2 from the first luminosity Y1 to calculate a first luminosity difference, and subtracts the second luminosity Y2 from the third luminosity Y3 to calculate a second luminosity difference.

The second determining unit 572 determines whether an absolute value of the first luminosity difference is greater than that of the second luminosity difference. When the answer is yes, the second determining unit 572 defines the luma edge intensity as the absolute value of the first luminosity difference. When the answer is no, the second determining unit 572 defines the luma edge intensity as the absolute value of the second luminosity difference.

When two vertically arranged pixels belong to different luma areas, a difference may exist between luminosities corresponding to the pixels. Therefore, the third defining unit 564 identifies whether a cross-luma area is present according to the luma edge intensity. For example, when the luma edge intensity is the absolute value of the first luminosity difference and is greater than a predetermined threshold, it is rather possible that a luma area edge exists between the first pixel and the third pixel. Therefore, the first chromaticity V1 calculated according to the 2D image processing method is given a lower weight.

The fifth part discusses how to define a weight of a luminosity. Reference may also be made to the above-mentioned description of calculating a chromaticity and defining a weight of a chromaticity. With respect to a notch filtering process for filtering luma components, a similar weight conception may be used for defining a filtering frequency range.

Figure 8:
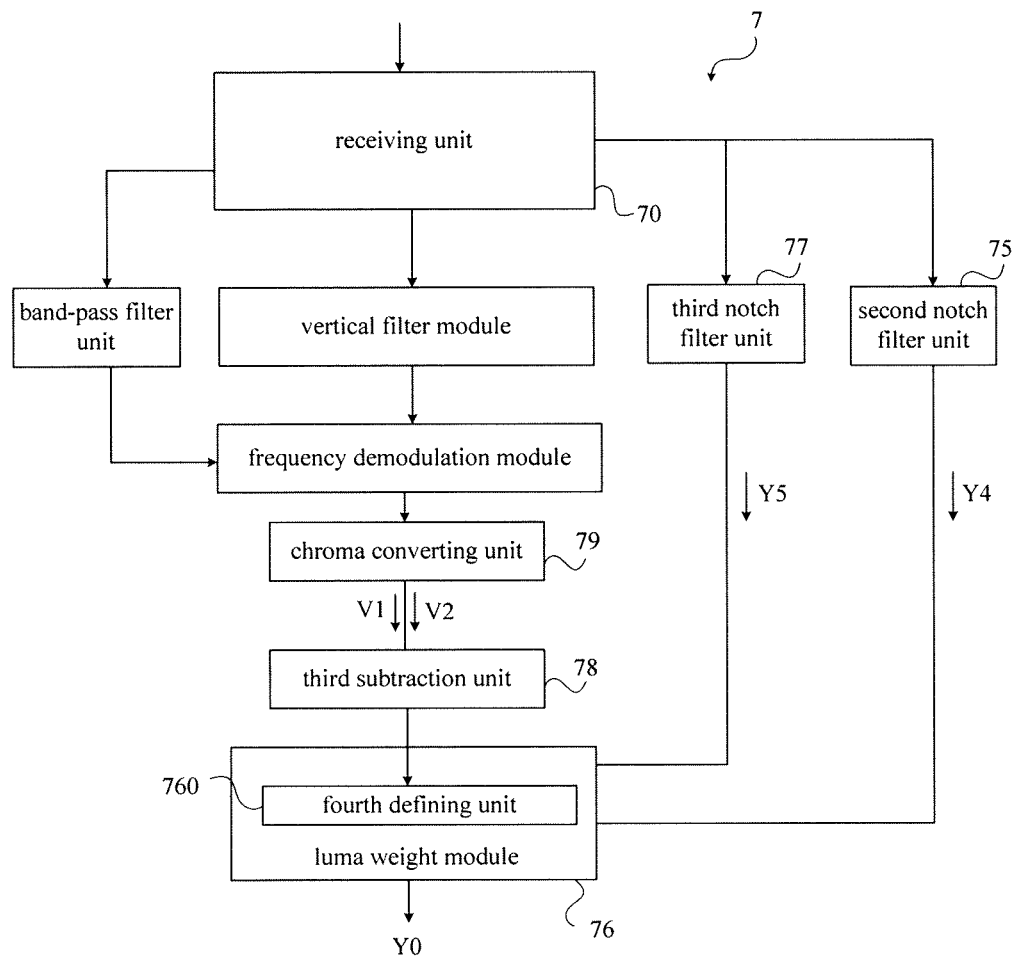
FIG. 8 is a block diagram of an image processing circuit in accordance with a third embodiment of the present invention.

In order to gain better a luma performance, an image processing circuit 7 is provided according to the present invention. Referring to FIG. 8, the image processing circuit 7 comprises a second notch filter unit 75, a third notch filter unit 77 and a luma weight module 76. The second notch filter unit 75 and the third notch filter unit 77 are coupled to a receiving unit 70, and the luma weight module 76 is coupled to the second notch filter unit 75 and the third notch filter unit 77.

The receiving unit 70 receives an image based on the SECAM specification. The image comprises a plurality of pixels at least comprising vertically, successively arranged a first pixel, a second pixel and a third pixel respectively corresponding to a first image signal, a second image signal and a third image signal.

The second notch filter unit 75 and the third notch filter unit 77 regard one image signal from the first, the second and the third image signals as a target image signal, and process the target image signal respectively by using a first frequency range and a second frequency range, so as to respectively calculate a fourth luminosity Y4 and a fifth luminosity Y5, where the second frequency range covers the first frequency range and is greater than the first frequency range.

The luma weight module 76 adds up two products of multiplying the fourth luminosity Y4 by a third weight and multiplying the fifth luminosity Y5 by a fourth weight to calculate a representative luminosity Y0 corresponding to the target image signal. The luma weight module 76 obtains chromaticities via a one-dimensional image processing method and a 2D image processing method to define the third and fourth weights, and a detailed process flow thereof shall be described below.

The image processing circuit 7 further comprises a chroma converting unit 79, and a third subtraction unit 78 coupled to the chroma converting unit 79. The third subtraction unit 78 subtracts the second chromaticity V2 from the first chromaticity V1 outputted by the chroma converting unit 79 to calculate a chromaticity difference.

The luma weight module 76, comprising a fourth defining unit 760 and being coupled to the third subtraction unit 78, defines the third weight and the fourth weight according to an absolute value of the chromaticity difference outputted by the third subtraction unit 78. For greater absolute values of the chromaticity difference, a narrower frequency range is applied so that the third weight is defined as being greater than the fourth weight; for smaller absolute values of the chromaticity difference, a wider frequency range is applied so that the third weight is defined as being smaller than the fourth weight.

Figure 3A:
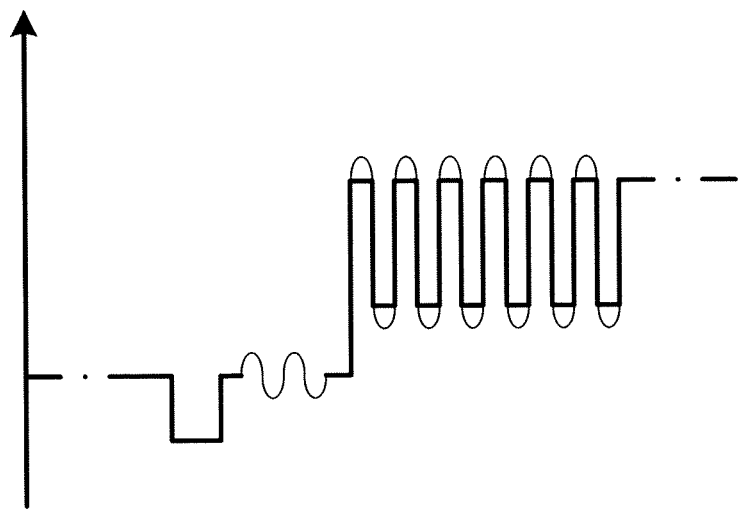
FIG. 3A is a waveform diagram of a CVBS in a multi-burst pattern.
Figure 3B:
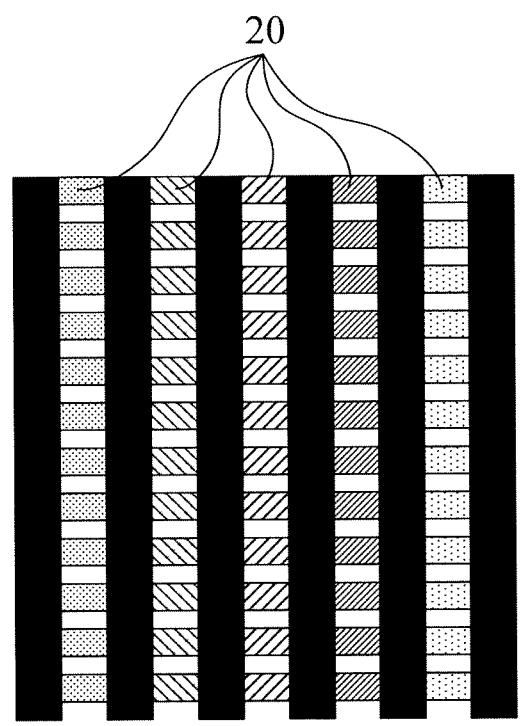
FIG. 3B shows an image displayed after being processed by the image processing circuit of the prior art as illustrated in FIG. 3A.

In conclusion, as disclosed in the foregoing first part and the second part, abnormal color blocks, formed in a multi-burst pattern from applying a one-dimensional image processing method (corresponding to the image processing circuit 1 illustrated in FIG. 2) of the prior art, are avoided via a vertical filter calculation using a 2D image processing method (corresponding to the image processing circuit 3 illustrated in FIG. 3) according to an embodiment of the present invention.

As disclosed in the foregoing third part and the fourth part, by defining weights, an image processing circuit such as the image processing circuit 5 illustrated in FIG. 7A properly gives a weight proportion to a first chromaticity and a second chromaticity, which are respectively calculated via the 2D image processing method according to an embodiment of the present invention and a conventional one-dimensional image method. Therefore, for different color distribution situations, a reliable chromaticity is generated according to the present invention.

As disclosed in the foregoing fifth part, an image processing circuit such as the image processing circuit 7 illustrated in FIG. 8 determines a current color distribution according to a difference of a first chromaticity and a second chromaticity, so as to properly define a filtering frequency range for filtering luma components in a notch filtering process. Therefore, in situations of different color distributions, an image processing circuit according to an embodiment of the present invention is capable of effectively separating chroma and luma components.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image processing method, for processing an image based on a SECAM system, the image comprising successively arranged in a vertical line a first pixel, a second pixel and a third pixel respectively corresponding to a first image signal, a second image signal and a third image signal, the image processing method comprising:
   calculating a first chroma signal via a vertical filtering process according to the first image signal, the second image signal and the third image signal, wherein the vertical filtering process comprises a multiplication operation and an addition operation;
   calculating a first chroma angular frequency via a frequency demodulation process according to the first chroma signal; and
   generating a first chromaticity according to the first chroma angular frequency.

2. The image processing method as claimed in claim 1, wherein the step of calculating the first chroma signal comprises:
   respectively multiplying the first image signal, the second image signal and the third image signal by a first multiple, a second multiple and a third multiple, a sum of the first multiple, the second multiple and the third multiple being equal to zero; and
   adding up the multiplied first image signal, the multiplied second image signal and the multiplied third image signal to calculate the first chroma signal.

3. The image processing method as claimed in claim 1, further comprising:
   selecting a target image signal from the first, the second and the third image signals and performing a filtering process on the target image signal to calculate a second chroma signal;
   calculating a second chroma angular frequency via the frequency demodulation process according to the second chroma signal; and
   obtaining a second chromaticity according to the second chroma angular frequency.

4. The image processing method as claimed in claim 3, further comprising:
   adding two products from respectively multiplying the first chromaticity and the second chromaticity by a first weight and a second weight to calculate a representative chromaticity.

5. The image processing method as claimed in claim 4, before the step of adding up the two products to calculate the representative chromaticity, further comprising:
   determining whether the first chroma angular frequency is greater than a threshold;
   defining the first weight as being smaller than the second weight when the first chroma angular frequency is greater than the threshold; and
   defining the first weight as being greater than the second weight when the first chroma angular frequency is not greater than the threshold.

6. The image processing method as claimed in claim 4, wherein the pixels successively arranged in a vertical line further comprises a fourth pixel and a fifth pixel respectively corresponding to a fourth image signal and a fifth image signal; the fourth pixel, the first pixel, the second pixel, the third pixel and the fifth pixel are successively arranged in sequence; and before the step of adding up the two products to calculate the representative chromaticity, the method further comprises:
   calculating a third chromaticity via the vertical filtering process and the frequency demodulation process according to the fourth image signal, the first image signal and the second image signal;
   calculating a fourth chromaticity via the vertical filtering process and the frequency demodulation process according to the second image signal, the third image signal and the fifth image signal;
   calculating a chroma edge intensity via a chroma edge detecting process according to the third chromaticity, the first chromaticity and the fourth chromaticity; and
   defining the first weight and the second weight according to the chroma edge intensity.

7. The image processing method as claimed in claim 6, wherein the step of calculating the chroma edge intensity comprises:
   subtracting the first chromaticity from the third chromaticity to calculate a first chromaticity difference;
   subtracting the first chromaticity from the fourth chromaticity to calculate a second chromaticity;
   determining whether an absolute value of the first chromaticity difference is greater than that of the second chromaticity;
   defining the absolute value of the first chromaticity as the chroma edge intensity when the absolute value of the first chromaticity difference is greater than that of the second chromaticity; and
   defining the absolute value of the second chromaticity as the chroma edge intensity when the absolute value of the first chromaticity difference is not greater than that of the second chromaticity.

8. The image processing method as claimed in claim 4, before the step of calculating the representative chromaticity, further comprising:
   respectively performing a notch filtering process on the first image signal, the second image signal and the third image signal to calculate a first luminosity corresponding to the first pixel, a second luminosity corresponding to the second pixel, and a third luminosity corresponding to the third pixel;
   calculating a luma edge intensity via a luma edge detecting process according to the first luminosity, the second luminosity and the third luminosity; and
   defining the first weight and the second weight according to the luma edge intensity.

9. The image processing method as claimed in claim 8, wherein the step of calculating the luma edge intensity comprises:
   subtracting the second luminosity from the first luminosity to calculate a first luminosity difference;
   subtracting the second luminosity from the third luminosity to calculate a second luminosity difference;
   determining whether an absolute value of the first luminosity difference is greater than that of the second luminosity difference;
   defining the absolute value of the first luminosity difference as the luma edge intensity when the absolute value of the first luminosity difference is greater than that of the second luminosity difference; and
   defining the absolute value of the second luminosity difference as the luma edge intensity when the absolute value of the first luminosity difference is not greater than that of the second luminosity difference.

10. The image processing method as claimed in claim 3, further comprising:
    defining a first frequency range and a second frequency range of a notch filtering process, wherein the second frequency range covers the first frequency range and is greater than the first frequency range;
    performing the notch filtering process on the target image signal by using the first frequency range to calculate a fourth luminosity;
    performing the notch filtering process on the target image signal by using the second frequency range to calculate a fifth luminosity; and
    adding up two products from respectively multiplying the fourth luminosity and the fifth luminosity by a third weight and a fourth weight to calculate a representative luminosity corresponding to the target image signal.

11. An image processing circuit, for processing an image based on a SECAM system, comprising:
    a receiving unit, for receiving the image comprising successively arranged in a vertical line a first pixel, a second pixel and a third pixel respectively corresponding to a first image signal, a second image signal and a third image signal;
    a vertical filtering module, coupled to the receiving unit, for calculating a first chroma signal according to the first image signal, the second image signal and the third image signal, wherein the vertical filtering module is configured to perform a multiplication operation and an addition operation;
    a frequency demodulation module, coupled to the vertical filter module, for calculating a first chroma angular frequency according to the first chroma signal; and
    a chroma converting unit, coupled to the frequency demodulation module, for generating a first chromaticity according to the first chroma angular frequency.

12. The image processing circuit as claimed in claim 11, wherein the vertical filter module comprises:
    a first multiplication unit, for respectively multiplying the first image signal, the second image signal and the third image signal by a first multiple, a second multiple and a third multiple, a sum of the first, second and third multiples being equal to zero; and
    an addition unit, coupled to the first multiplication unit, for adding up the multiplied first image signal, the multiplied second image signal and the multiplied third image signal to calculate the first chroma signal.

13. The image processing circuit as claimed in claim 11, further comprising:
    a filter unit, coupled to the receiving unit, for calculating a second chroma signal according to a target image signal, which is one image signal from the first, the second and the third image signals;
    wherein, the frequency demodulation module coupled to the filter unit calculates a second chroma angular frequency according to the second chroma signal, and the chroma converting unit generates a second chromaticity according to the second chroma angular frequency.

14. The image processing circuit as claimed in claim 13, further comprising:
    a chroma weight module, coupled to the chroma converting unit, for adding up two products from respectively multiplying the first chromaticity and the second chromaticity by a first weight and a second weight to calculate a representative chromaticity.

15. The image processing circuit as claimed in claim 14, wherein the chroma weight module further comprises:
    a first defining unit, coupled to the frequency demodulation module, for defining the first weight as being smaller than the second weight when the first chroma angular frequency is greater than a threshold and defining the first weight as being greater than the second weight when the first chroma angular frequency is not greater than the threshold.

16. The image processing circuit as claimed in claim 14, wherein the pixels successively arranged in the vertical line further comprise a fourth pixel and a fifth pixel respectively corresponding to a fourth image signal and a fifth image signal; the fourth pixel, the first pixel, the second pixel, the third pixel and the fifth pixel are successively arranged in sequence; the vertical filter module, the frequency demodulation module and the chroma converting unit calculate a third chromaticity according to the fourth image signal, the first image signal and the second image signal, and calculate a fourth chromaticity according to the second image signal, the third image signal and the fifth image signal; and the image processing circuit further comprises:
    a chroma edge detecting module, coupled to the chroma converting module, for calculating a chroma edge intensity according to the third chromaticity, the first chromaticity and the fourth chromaticity;
    wherein, the chroma weight module comprises a second defining unit, coupled to the chroma edge detecting module, for defining the first weight and the second weight according to the chroma edge intensity.

17. The image processing circuit as claimed in claim 16, wherein the chroma edge detecting module comprises:
    a first subtraction unit, for subtracting the first chromaticity from the third chromaticity to calculate a first chromaticity difference and subtracting the first chromaticity from the fourth chromaticity to calculate a second chromaticity difference; and
    a first determining unit, coupled to the first subtraction unit, for determining whether an absolute value of the first chromaticity difference is greater than that of the second chromaticity difference, and defining the absolute value of the first chromaticity difference as the chroma edge intensity when the absolute value of the first chromaticity difference is greater than that of the second chromaticity difference and defining the absolute value of the second chromaticity difference as the chroma edge intensity when the absolute value of the first chromaticity difference is not greater than that of the second chromaticity difference.

18. The image processing circuit as claimed in claim 14, further comprising:

a first notch filter unit, coupled to the receiving unit, for processing the first image signal, the second image signal and the third image signal to respectively calculate a first luminosity corresponding to the first pixel, a second luminosity corresponding to the second pixel and a third luminosity corresponding to the third pixel; and a luma edge detecting module, coupled to the first notch filter unit, for calculating a luma edge intensity according to the first luminosity, the second luminosity and the third luminosity;

wherein, the chroma weight module comprises a third defining unit, coupled to the luma edge detecting module, for defining the first weight and the second weight according to the luma edge intensity.

19. The image processing circuit as claimed in claim 18, wherein the luma edge detecting module comprises:

a second subtraction unit, for subtracting the second luminosity from the first luminosity to calculate a first luminosity difference and subtracting the second luminosity from the third luminosity to calculate a second luminosity difference; and a second determining unit, coupled to the first subtraction unit, for determining whether an absolute value of the first luminosity difference is greater than that of the second luminosity difference, and defining the absolute value of the first luminosity difference as the luma edge intensity when the absolute value of the first luminosity difference is greater than that of the second luminosity difference and defining the absolute value of the second luminosity difference as the luma edge intensity when the absolute value of the first luminosity difference is not greater than that of the second luminosity difference.

20. The image processing circuit as claimed in claim 13, further comprising:

a second notch filter unit, coupled to the receiving unit, for processing the target image signal by using a first frequency range to calculate a fourth luminosity;

a third notch filter unit, coupled to the receiving unit, for processing the target image signal by using a second frequency range to calculate a fifth luminosity, wherein the second filtering frequency range covers the first filtering frequency range and is greater than the first filtering frequency range; and a luma weight module, coupled to the second notch filter unit and the third notch filter unit, for adding up two products from respectively multiplying the fourth luminosity and the fifth luminosity by a third weight and a fourth weight to calculate a representative luminosity corresponding to the target image signal.

\* \* \* \* \*